Figure 1:
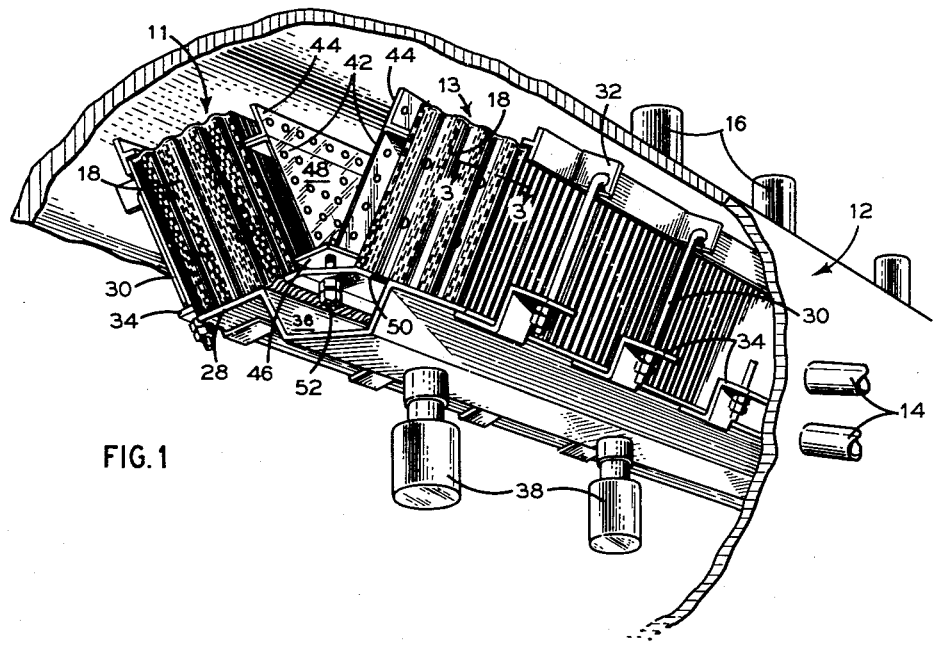

July 25, 1961     E. E. COULTER     2,993,565

LIQUID AND GAS SEPARATING APPARATUS

Filed June 30, 1958

INVENTOR.
Earl E. Coulter

BY *J. P. Moran*

ATTORNEY

United States Patent Office 2,993,565
Patented July 25, 1961

2,993,565
LIQUID AND GAS SEPARATING APPARATUS
Earl E. Coulter, Alliance, Ohio, assignor to The Babcock & Wilcox Company, New York, N.Y., a corporation of New Jersey
Filed June 30, 1958, Ser. No. 745,437
3 Claims. (Cl. 183—79)

This invention relates in general to the construction and operation of apparatus for separating liquids from gases and more particularly to separating apparatus adapted for use in the steam space of a steam and water drum of a steam generating unit for the removal of suspended moisture and solids from the outgoing steam.

The importance in steam generation of providing clean dry steam has long been recognized, but as the operating pressures and capacities of steam generators have markedly increased, the need for removal of moisture and other impurities from the steam to a greater degree has become more important to avoid deposits in the associated superheater and/or turbine. This is particularly true where the circulating water of the steam generator contains a high concentration of solids for the purpose of preventing internal corrosion of the pressure parts. Small particles of the solid material are present in suspension or solution in the moisture carried by the steam entering the boiler steam and water drum, and unless removed from the steam before its exit from the drum, would deposit in the superheater and/or associated turbine, thereby increasing outage and maintenance of this equipment.

This invention is particularly directed to improvements in separating apparatus of the type shown in U.S. Patent 2,058,240 in which wet steam is passed along and in intimate contact with a large area of liquid collecting surface in the form of a series of closely spaced continuously curved imperforate corrugated plates arranged side-by-side in a slightly nested formation to define a series of narrow shallow sinuous flow channels therebetween, with the plate corrugations arranged to facilitate the gravity discharge of separated liquid. It has been found that the moisture and solids separating efficiency of separators of this character is adversely affected, particularly at high boiler loads, by the relatively small degree of flow turbulence attained by the use of plates having smooth shallow imperforate corrugations.

In accordance with my invention the plate corrugations of a liquid and gas separator of the character described are perforated so that most of the wet gas passing through the channels of the separator flows interchangeably in a sinuous path between adjacent channels and along and in intimate contact with the opposite surfaces of the plates to cause eddies adjacent the surfaces of the plates and impingement of liquid thereon, thereby effecting more efficient separation of suspended liquid and solids from the gas. By providing the means of delivering clean, dry steam, in its specific application, to the superheater and/or associated prime mover, the separator of the invention not only brings about a vastly improved operating condition, but effects considerable saving in upkeep costs, promotes increased availability, and provides protection of the superheater tubes against burnout and failure.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which certain specific embodiments of the invention are illustrated and described.

Figure 2:
Figure 3:
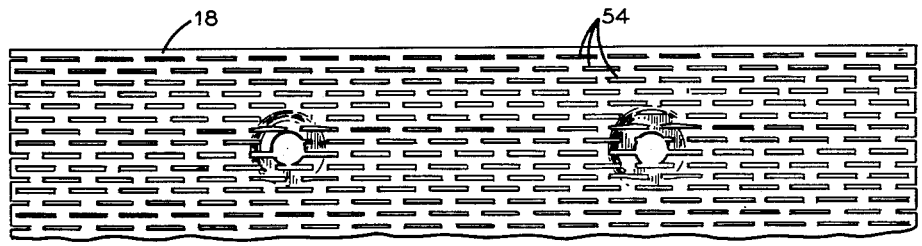

Of the drawings:
FIG. 1 is a fragmentary perspective view of a steam and water drum of a steam generator incorporating a plate separator constructed in accordance with my invention;
FIG. 2 is an enlarged view of one of the plates of the separator of FIG. 1; and
FIG. 3 is a sectional view taken along the line 3—3 of FIG. 1.

In the construction illustrated in the drawings, the separator is positioned in the steam space of a horizontally arranged steam and water drum 12 of a steam generating unit and receives a mixture of steam and water from the riser circuits of the unit entering the drum 12 through steam and water tubes 14 connected to the side of the drum above the normal water level therein. The drum 12 is also provided with the usual downcomer connections (not shown) to supply the riser circuits and with one or more rows of steam outlet connections 16 symmetrically arranged along the top of the drum.

The separator is made in oppositely inclined twin sections 11 and 13 symmetrically arranged at opposite sides of the steam outlets 16 and extending longitudinally of the uppermost portion of the drum. Each separator section is formed by a series of closely spaced corrugated sheet metal plates 18 arranged side-by-side in vertical planes parallel to the general direction of steam flow to define a series of narrow undulating substantially unobstructed flow channels 20 extending transversely of the drum 12. The plates 18 are continuously curved to form a series of shallow corrugations extending transversely of the general direction of steam flow in the channels 20. The plates 18 are uniformly spaced apart and adjacent plates are slightly nested to promote contact of the wet steam with the moisture collecting surfaces of the plates during its passage through the channels 20. The plates 18 in each separator section are assembled on rods 24, with curved spacer members 26 between each pair of adjacent plates 18.

The corrugated plates 18 extend from the drum wall to a common bottom plate 28 which is carried by hook bolts 30 connected at their upper ends to angle bars 32 welded to the drum wall and at their lower ends to Z bars 34 welded to the plate 28. The bottom plate 28 closes the lower end of the plate channels 20 over a major portion of their extent and has its central portion shaped to form a common moisture collecting chamber 36 which receives the water and solids dissolved therein separated from the steam and water mixture passing through the separator sections. The moisture is discharged into the interior of the drum 12 through water sealed drains 38 which prevent steam from by-passing the separator sections. The ends of the separator housing are closed by end plates (not shown) welded to the drum wall and to the plate 28, thus preventing any steam from by-passing the separator sections. A pair of upwardly diverging channel shaped perforated plates 42 are arranged at the discharge side of the separator sections 11 and 13, are connected at their upper ends to perforated angle plates 44 welded to the drum wall and at their lower ends to an inverted V-shaped plate 46, and cooperate with the drum wall, the end plates and plates 44, 46 to form a common steam collecting space 48 to which the steam outlet tubes 16 open. The plates 42 and 44 are perforated to create a resistance to flow and thereby provide a substantially uniform steam flow through the channels 20 of the corresponding separator section. The lower inner corners of the separator sections are supported by a plate 50 connected to the plate 46 by bolts 52 and uniting with the end plates and the plate 28 to form the moisture collecting chamber 36.

In accordance with the invention, the corrugations of each of the plates 18 have oblong slot-like perforations 54 therein arranged in rows in the direction of steam flow, with each perforation having its major axis normal to the direction of flow and with the perforations of each row staggered relative to the perforations in the next adjacent row. With the separator constructed and arranged as described, the wet steam enters at opposite sides of the separator and is divided into a plurality of thin parallel streams by the plates 18 for flow through the undulating channels 20 formed therebetween. During the passage of the wet steam through the channels 20, each thin stream divides into a large number of small streams most of which flow interchangeably in a sinuous path between adjacent channels by way of the slots 54 and along and in intimate contact with the opposite surfaces of the plates 18. The slots 54 in the corrugations promote small and local disturbances in the flow path of the wet steam through the channels 20 and thereby cause local high velocity eddies which are effective in impinging moisture particles in the wet steam on the adjacent plate surfaces. The use of shallow perforated corrugations causes enough change in the direction of wet steam flow to maintain a turbulence and eddy currents sufficient to bring most of the particles of moisture carried by the steam into contact with the collecting surfaces within the available distance. The moisture is separated by adhesion to the contacted collecting surfaces and inertia on the changes in direction of the wet steam flow. The moisture as collected on the plates 18 flows downwardly along the corresponding corrugations and adjacent the slots therein, with some of the moisture flowing onto the plate 28 and over the inlet edges thereof and the remaining portion of the separated moisture flowing into the chamber 36 for discharge therefrom through the drains 38. The purified steam flows through the perforations in the plates 42, 44 and into the dry steam space 48, and thence through the steam outlet tubes 16 to a point of use.

By way of example and not of limitation, I have found that a highly effective separation is attained with each separator section formed by 22 gauge metallic plates having a height of 12⅛" and extending 7⅝" in the direction of gas flow; and having continuously curved corrugations of $7/10"$ radius, 1¼" width, and ¼" depth, and rows of side staggered slots ⅛" x ½" arranged to provide 42 percent open area in each plate 18, with the plates uniformly spaced $7/32"$ apart. Tests conducted on a separator so constructed and arranged indicated that its efficiency in separating moisture and solids from wet steam is two to three times greater under the same conditions of operation than prior art corrugated plate separators of the same construction and arrangement but having no slots or perforations in the corrugations.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for separating liquid from a wet gas comprising a plurality of corrugated liquid separating plates arranged side-by-side in spaced relation to form narrow undulating substantially unobstructed gas flow channels therebetween with the plates extending parallel to the general direction of gas flow and with the plate corrugations extending transversely of the general direction of gas flow in said channels, the corrugations of each plate having rows of perforations therein through which at least a portion of the gas flow interchangeably in a sinuous path between adjacent channels and along and in intimate contact with the opposite surfaces of said plates while passing through said channels to cause eddies adjacent the surfaces of said plates and impingement of liquid thereon, thereby effecting separation of the liquid from the gas, with all of the perforations in each row of each plate being arranged in overlapping and staggered relation with the perforations in the next adjacent row, and means for conducting separated liquid out of the path of gas flow.

2. Apparatus for separating liquid from a wet gas comprising a plurality of corrugated liquid separating plates arranged side-by-side in spaced relation to form narrow undulating substantially unobstructed gas flow channels therebetween with the plates extending parallel to the general direction of gas flow and with the plate corrugations extending transversely of the general direction of gas flow in said channels, the corrugations of each plate having rows of oblong perforations therein arranged with their major axes extending normal to the general direction of gas flow in said channels and through which at least a portion of the gas flows interchangeably in a sinuous path between adjacent channels and along and in intimate contact with the opposite surfaces of said plates while passing through said channels to cause eddies adjacent the surfaces of said plates and impingement of liquid thereon, thereby effecting separation of the liquid from the gas, with all of the perforations in each row of each plate being arranged in overlapping and staggered relation with the perforations in the next adjacent row, and means for conducting separated liquid out of the path of gas flow.

3. Apparatus for separating liquid from a wet gas comprising a plurality of corrugated liquid separating plates arranged side-by-side in spaced relation to form narrow undulating substantially unobstructed gas flow channels therebetween with the plates extending parallel to the general direction of gas flow and with the plate corrugations extending transversely of the general direction of gas flow in said channels, adjacent plates being spaced apart a distance not greater than a depth of said corrugations, the corrugations of each plate having rows of oblong perforations therein arranged with their major axes extending normal to the general direction of gas flow in said channels and through which at least a portion of the gas flows interchangeably in a sinuous path between adjacent channels and along and in intimate contact with the opposite surfaces of said plates while passing through said channels to cause eddies adjacent the surfaces of said plates and impingement of liquid thereon, thereby effecting separation of the liquid from the gas, with the perforations in each row of each plate being arranged in overlapping and staggered relation with the perforations in the next adjacent row, and means for conducting separated liquid out of the path of gas flow.

References Cited in the file of this patent

UNITED STATES PATENTS

| | | |
|---|---|---|
| 1,109,588 | Kluge | Sept. 1, 1914 |
| 2,127,917 | Hobbs | Aug. 23, 1938 |
| 2,479,625 | Kimmell | Aug. 23, 1949 |

FOREIGN PATENTS

| | | |
|---|---|---|
| 13,222 | Great Britain | of 1904 |